(12) United States Patent
Miura et al.

(10) Patent No.: US 6,360,142 B1
(45) Date of Patent: Mar. 19, 2002

(54) RANDOM WORK ARRANGING DEVICE

(75) Inventors: Katsuya Miura, Kobe; Yoshiki Kariya, Miki; Takuya Fukuda, Kakogawa; Akira Shouji, Mino, all of (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/689,182

(22) Filed: Oct. 12, 2000

(30) Foreign Application Priority Data

Oct. 13, 1999 (JP) .......................................... 11-291479
Jul. 19, 2000 (JP) ....................................... 2000-218394

(51) Int. Cl.[7] ............................................. G06F 19/00
(52) U.S. Cl. ...................... 700/245; 700/248; 700/249; 700/250; 700/258; 700/260; 700/275; 118/300; 29/771; 91/361; 198/395; 452/171
(58) Field of Search ................................. 700/245, 248, 700/249, 250, 258, 275, 260; 118/300; 029/771; 091/361; 198/395; 452/171

(56) References Cited

U.S. PATENT DOCUMENTS 4,891,530 A * 1/1990 Hatji
4,893,402 A * 1/1990 Hirasaka et al. ............. 029/771
5,431,086 A * 7/1995 Morita et al. ................ 091/361
5,487,781 A * 1/1996 Brennan et al. ............. 118/300
5,687,831 A * 11/1997 Carlisle ....................... 198/395
5,882,252 A * 3/1999 Boody et al. ................ 452/171
6,089,968 A * 7/2000 Andre et al. ................. 452/171
6,115,990 A * 9/2000 Vogelsanger ................. 053/53
6,256,091 B1 * 7/2001 Kobayashi ............... 356/237.1
6,275,748 B1 * 8/2001 Bacchi et al. ................ 700/275

FOREIGN PATENT DOCUMENTS

JP          7-281721          10/1995
JP          2717771           6/1996

OTHER PUBLICATIONS

Gosh et al., Planning and ontrol in reconfigurable manufacturing workcell, 1997, IEEE, p. 38.*

* cited by examiner

Primary Examiner—William A. Cuchlinski, Jr.
Assistant Examiner—McDiedunel Marc
(74) Attorney, Agent, or Firm—Marshall, Gerstein & Borun

(57) ABSTRACT

A random work arranging device that arranges randomly conveyed works by using a robot and carries out the arranged works, wherein the robot comprises a plurality of arms and a single robot controller for controlling respective arms independently one another to arrange and transfer the works from a conveying position to a carry-out position.

25 Claims, 13 Drawing Sheets

RANDOM WORK ARRANGING DEVICE

BACKGROUND OF THE INVENTION

1. Field of the Invention

The present invention relates to a device for arranging random works. More particularly, the present invention relates to a device in which one robot is provided with a plurality of arms to arrange various works randomly conveyed and carry out the arranged works to a subsequent step.

2. Description of the Related Art

Conventionally, products (hereinafter referred to as "works") such as tubes, bottles and caps used as containers of chemicals or cosmetics are generally arranged to have a predetermined posture so that packing of them in boxes and attachment of labels to them can be easily carried out.

More specifically, since a large quantity of works are formed and supplied in a disorderly manner, i.e., at random, they are arranged by a device named "a part feeder" and then transferred to a subsequent step. The part feeder is intended to basically handle only one type of works and is a device with a comparatively simple mechanism that is designed and manufactured according to a required processing ability each time. For this reason, a sufficiently high processing ability cannot be achieved and the change of the type of works is inadequately dealt with. When plural types of works need to be handled, time required for set up becomes correspondingly longer, which results in low productivity.

Particularly when plural types of works need to be handled or a high processing ability is demanded, a method for arranging works by using a robot comprising an image processing device (vision) is conventionally used. In this method, specifically, a vision sensor such as a CCD (charge coupled device) camera is adapted to capture information pertaining to a position or posture of each work and the arm of the robot is controlled according to this information to arrange the works. This method is advantageous in that the mere switching of an operation program according to the change of the type of works makes it possible to handle various types of works and the time required for set up can be thereby reduced.

In a comparatively simple work operation such as an arranging operation, since there is little difference between the processing ability of the conventional general-purpose robot and the processing ability of the part feeder, the number of robots is increased when a higher processing ability is demanded. In this case, a plurality of robots each comprising the robot controller, the arm, and the image processing device are totally controlled by using a total control board that also controls peripheral devices such as a conveyor for conveying works to thereby carry out a work operation (see Japanese Patent Application Publication No. Hei. 7-281721 and Japanese Patent No. 2717771). These references disclose systems in which the image processing device is not essential.

However, the method for improving the processing ability by increasing the number of the robots makes a system complicated and causes degraded cost-performance. The too complicated system for dealing with the comparatively simple work operation such as arrangement of works has resulted in obstructions to the improvement in the processing ability.

SUMMARY OF THE INVENTION

The present invention has been developed for the purpose of obviating the aforesaid problem of the prior art, and an object of the present invention is to provide an improved device capable of simplifying a system and thereby improving a processing ability greatly when the robot performs a comparatively simple work operation such as transfer of works and when various types of works randomly conveyed are arranged and carried out to a subsequent step by using the robot.

In accordance with the present invention, there is provided a random work arranging device that arranges randomly conveyed works by using a robot and carries out the arranged works, wherein the robot comprises a plurality of arms and a single robot controller for controlling respective arms independently one another to arrange and transfer the works from a conveying position to a carry-out position.

In the arranging device, the robot of the arranging device arranges and transfers the works from the conveying position to the carry-out position according to a signal from a position sensor for detecting a conveying position of a conveying mechanism for conveying the work and a signal from a vision sensor for detecting a position, posture, and/or shape of the work conveyed by the conveying mechanism.

Preferably, the work which has not been carried out is returned to a conveying starting point.

Preferably, the work is made to have a desired posture while it is transferred by each of the arms.

Preferably, each of the arms is specified to transfer a specific work.

Preferably, when deciding that there is a work that cannot be transferred by arms, an arm is specified to transfer a work situated upstream from the work that cannot be transferred.

Preferably, the work is prevented from rolling while it is conveyed.

Preferably, protrusions are provided on a surface of a conveying belt of the conveying mechanism such that they are arranged in a predetermined configuration. In this case, more preferably, the conveying belt including the protrusions is transparent.

Preferably, the arranging device comprises a light path changing means for changing a light path of light transmitted through the conveying belt. In this case, more preferably, the light path changing means is a mirror provided at a predetermined angle at a predetermined position above the conveying belt and an angle of the mirror is adjustable.

Preferably, the arranging device comprises an image processing means for recognizing a transparent work in a transparent work recognition process.

Preferably, the arranging device comprises a shape check unit for checking a shape of a work based on image data from the image processing means. In this case, an outer shape of the work is checked, the outer shape is checked based on various amounts of outer characteristics of the work, or the outer shape is checked based on specific information of a specific portion of the work.

Preferably, the arranging device comprises a defective discarding mechanism for discarding a work that has been judged defective in a check process performed by the shape check unit.

Preferably, each arm is constituted by three axes, two of which are controlled by the robot controller as axes of the robot. Each arm may be constituted by two axes, one of which may be controlled by the robot controller as an axis of the robot. In this case, an axis other than the axis controlled by the robot controller is controlled by the same as a peripheral device. Each arm may be constituted by three axes which are controlled by the robot controller by the axes of the robot. Each arm may be constituted by two axes which are controlled by the robot controller as the axes of the robot.

The robot controller of the arranging device comprises a peripheral device control unit for controlling a peripheral device such as a conveying mechanism including a conveying belt and a camera, a conveyor position detecting unit for detecting a position of the conveying belt; a work position detecting unit for detecting a position, posture and/or shape of each work based on image data generated by the image processing unit; a picking position computing unit for computing a position at which each work is to be picked on a carry-in conveyor for each arm based on information detected by the conveyor position detecting unit and the work position detecting unit; an allocation operation unit for specifying an arm among the arms to pick a specific work based on the information computed by the picking position computing unit and according to a predetermined allocation algorithm; and an arm control unit for controlling each arm to arrange the work on the carry-in conveyor according to an operation result by the allocation operation unit and the information computed by the picking position computing unit.

As should be appreciated, the structure of the arranging device that arranges works conveyed randomly and carries out the arranged works can be simplified and its processing ability can be greatly improved.

For instance, for a comparatively simple work operation, two axes of each arm constituted by three axes are controlled by the robot controller as the axes of the robot. Because the number of arms that can be controlled by a single robot controller is increased, the processing ability of one robot can be improved. The simplified structure of each arm brings about its high-speed operation and further improves the processing ability.

Depending on the type of a work operation, each arm is adapted to have two axes, one of which is controlled by the axis of the robot. In this case, since only the operation of the axis is controlled by the robot controller as the axis of the robot and the number of arms that can be controlled by a single robot controller can be thereby increased, the processing ability of one robot can be further improved. Also, the structure of the arms can be further simplified and the processing ability ca be improved with ease.

According to a preferred embodiment of the present invention, the transparent works and non-transparent works may coexist when conveyed. Therefore, time required for set up is reduced and further improved processing ability is achieved.

According to another preferred embodiment of the present invention, the works are prevented from rolling while they are conveyed. Because spherical works or cylindrical works can be processed like other works, the time required for set up is reduced and the processing ability can be further improved.

According to still another preferred embodiment of the present invention, the shape of the work is checked while it is conveyed. So, the shape check of the work in a subsequent steps can be dispensed with, and the steps and equipment can be simplified.

According to a further preferred embodiment of the present invention, the work that has been judged defective in a shape check process is discarded. The defective work is prevented from being conveyed to a subsequent step and the processing ability can be further improved.

This object, as well as other objects, features and advantages of the invention will become more apparent to those skilled in the art from the following description taken with reference to the accompanying drawings.

DETAILED DESCRIPTION OF THE PREFERRED EMBODIMENT

Hereinafter, preferred embodiments of the present invention will be described with reference to accompanying drawings. It should be remembered that the present invention is not limited to these embodiment.

Embodiment 1

Figure 1:
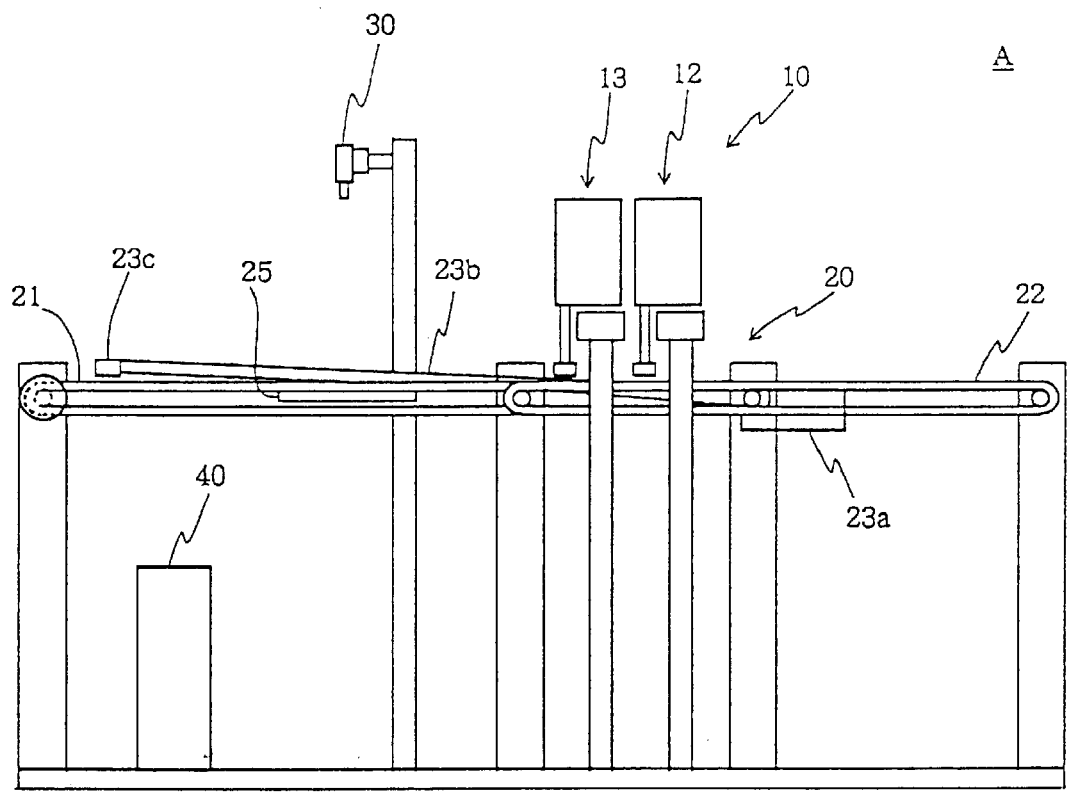
FIG. 1 is a front view showing a schematic structure of an arranging device according to a first embodiment of the present invention.
Figure 2:
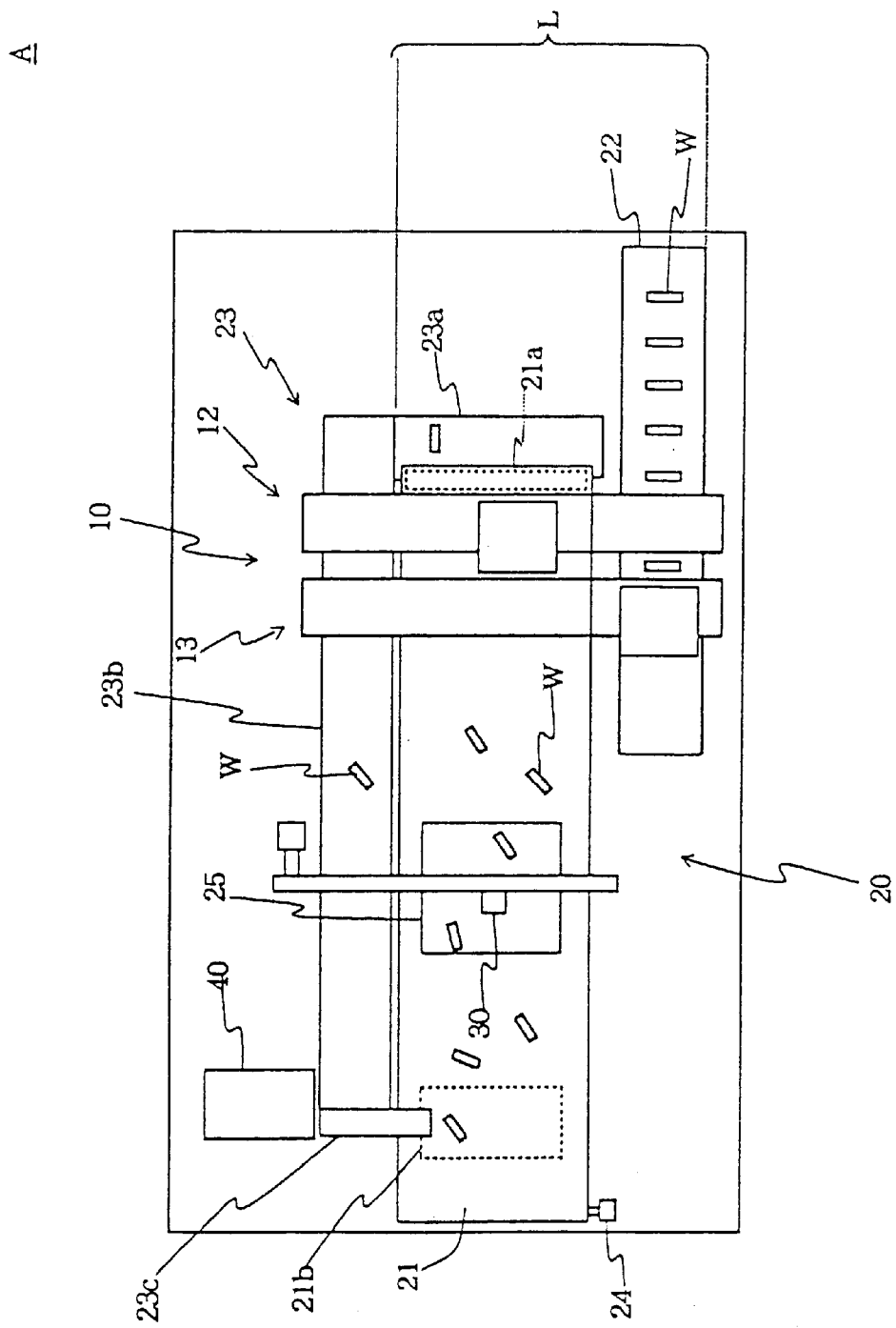
FIG. 2 is a plan view showing the schematic structure of the arranging device according to the first embodiment of the present invention.

FIG. 1 and FIG. 2 are a front view and a plan view of an arranging device according to a first embodiment of the present invention. Referring now to FIG. 1 and 2, an arranging device A comprises a robot 10 having a plurality of picking arms (hereinafter referred to as "arms"), a conveying mechanism 20 for conveying works W handled by the robot 10, and a camera 30 as a vision sensor for capturing image data of the works W conveyed by the conveying mechanism 20.

The robot 10 comprises a robot controller 40, and a plurality of picking arms 12, 13 controlled by the controller 40. The robot controller 40 serves to control each of the arms 12, 13 and peripheral devices such as the conveying mechanism 20 and the camera 30.

The conveying mechanism 20 comprises a carry-in conveyor 21 for conveying the works W supplied in a disorderly manner, i.e., at random, to a point where they can be handled by the robot 10, a carry-out conveyor 22 for conveying the works W arranged by the robot 10 to a subsequent step, a reverse conveying mechanism 23 for returning the works W which have been conveyed to a terminal point 21a of the carry-in conveyor 21 without being arranged by the robot 10 to a starting point 21b of the carry-in conveyor 21. While one carry-out conveyor 22 is illustrated in this embodiment, carry-out conveyors may be provided in plural rows.

The carry-in conveyor 21 is provided with an encoder 24 as a position sensor. The encoder 24 supplies information pertaining to a position of a conveying belt to the robot controller 11 as a conveyor encoder value. The conveying belt of the carry-in conveyor 21 is semitransparent and provided with a lighting device 25 thereunder for lighting the works W therethrough.

The reverse conveying mechanism 23 comprises an overflow shooter 23a provided rearward in a conveying direction of the carry-in conveyor 21 for catching the works W falling from the terminal point 21a, a return conveyor 23b for conveying the work W sent from the overflow shooter 23a to upstream from the carry-in conveyor 21, and a shooter 23c for transferring the works W conveyed by the return conveyor 23b to upstream from the carry-in conveyor 21 to the starting point 21b of the carry-in conveyor 21. It should be noted that one or both of the overflow shooter 23a and the shooter 23c can be used as a belt conveyor.

The camera 30 is constituted by a CCD (charge coupled device) sensor, and adapted to take an image of the work W conveyed by the carry-in conveyor 21 under the lighting by the lighting device 25, convert an image signal into an electric signal and supply the electric signal to the robot controller 40.

Figure 3:
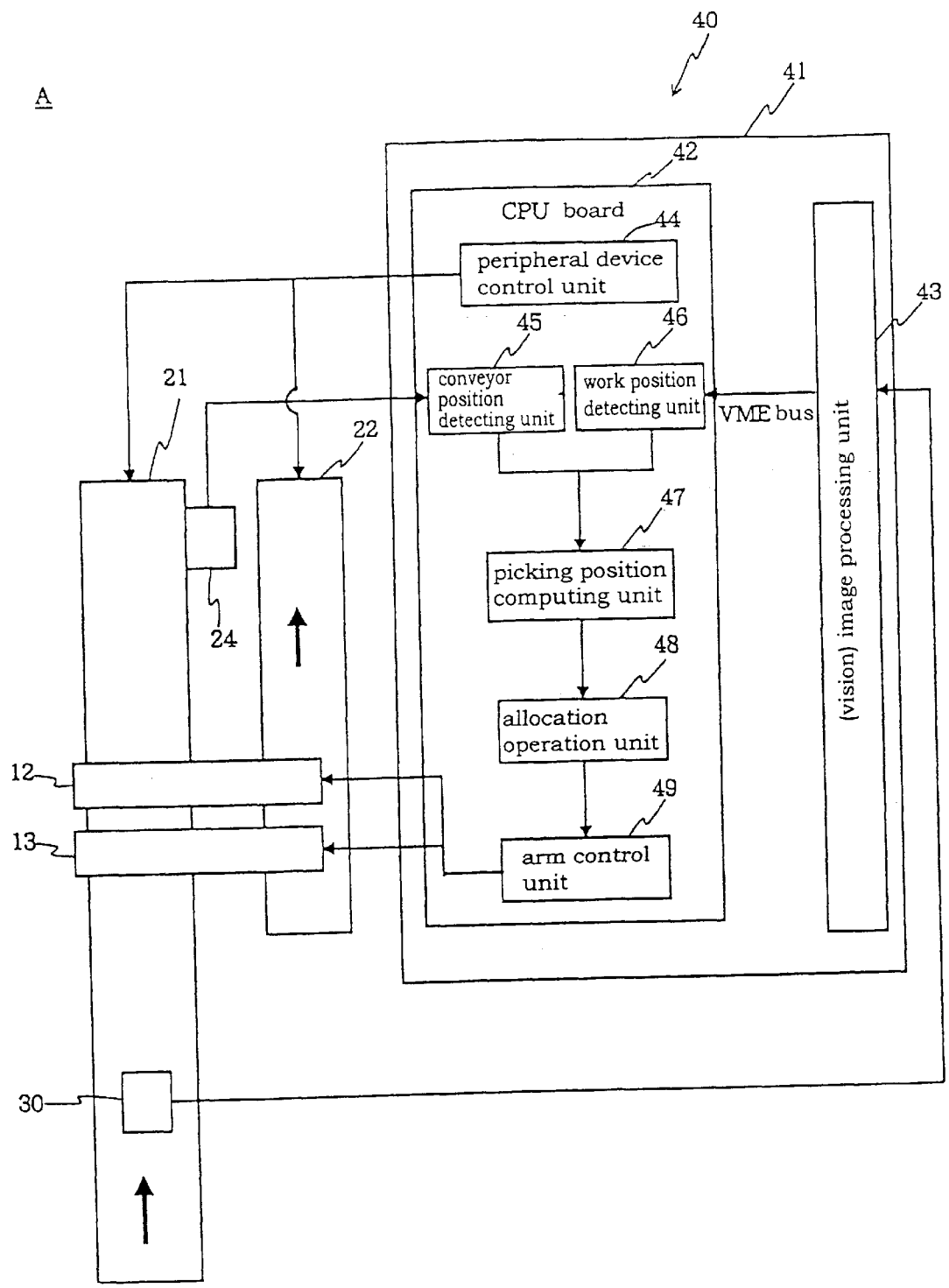
FIG. 3 is a block diagram showing a control system of the arranging device.
Figure 4:
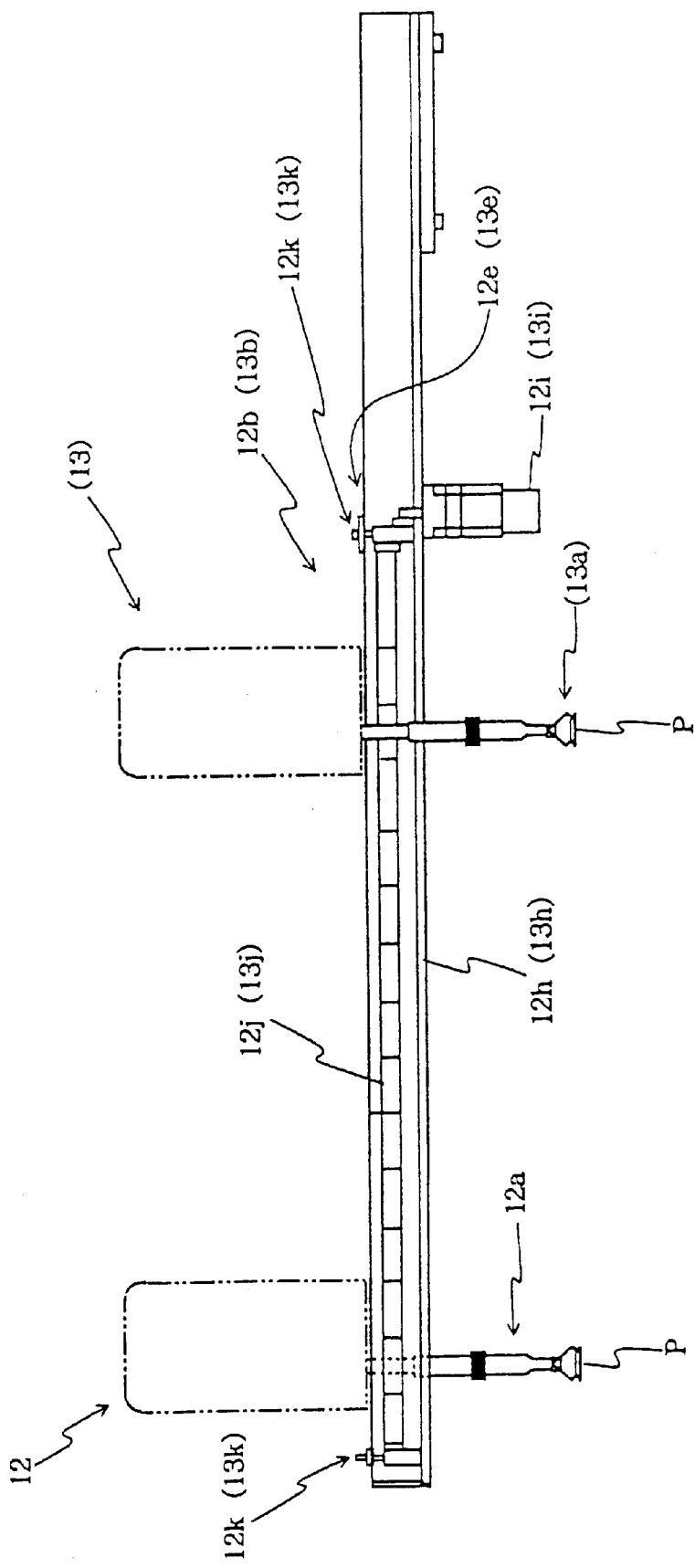
FIG. 4 is a front view showing a schematic structure of picking arms of the arranging device.
Figure 5:
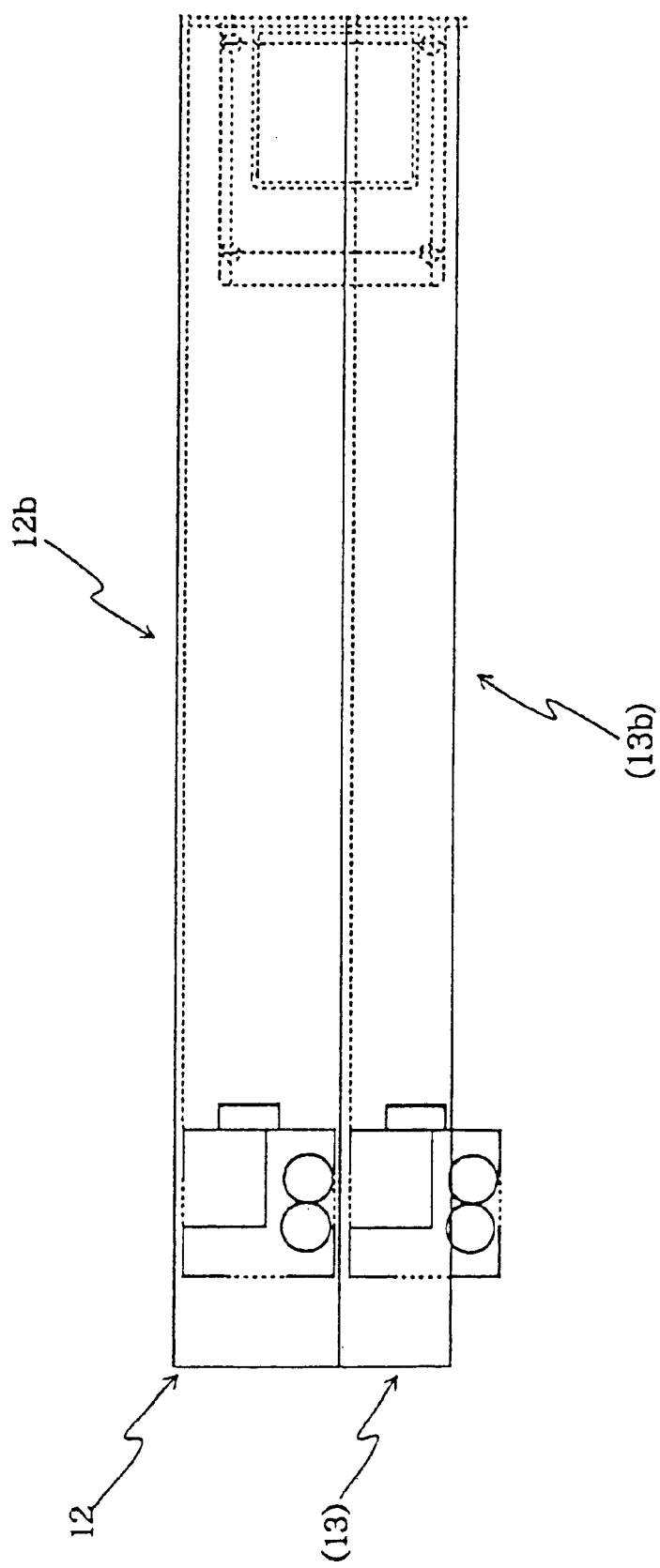
FIG. 5 is a plan view showing a schematic structure of the picking arms of the arranging device.
Figure 6:
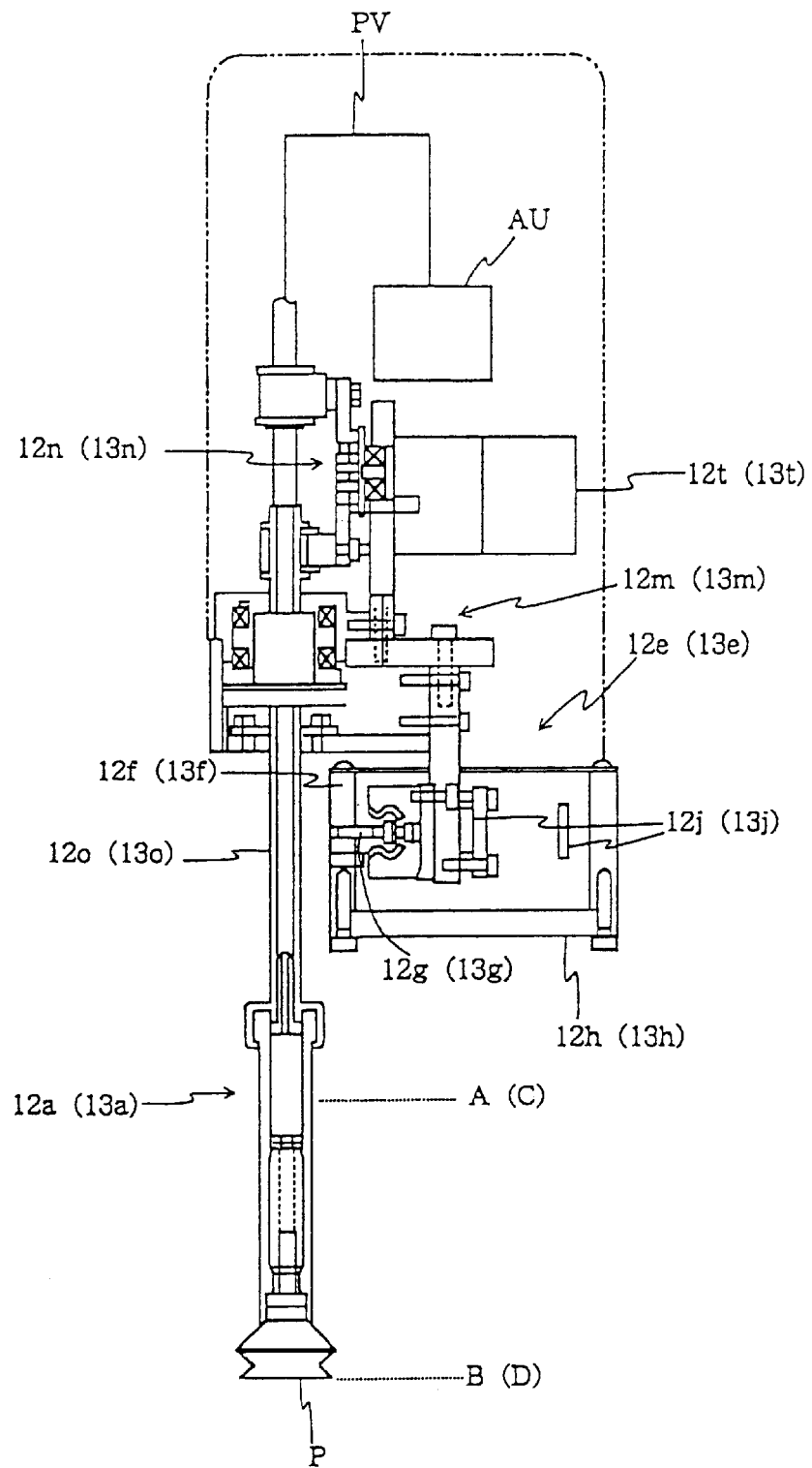
FIG. 6 is a partially enlarged front view showing a schematic structure of the picking arms of the arranging device.
Figure 7:
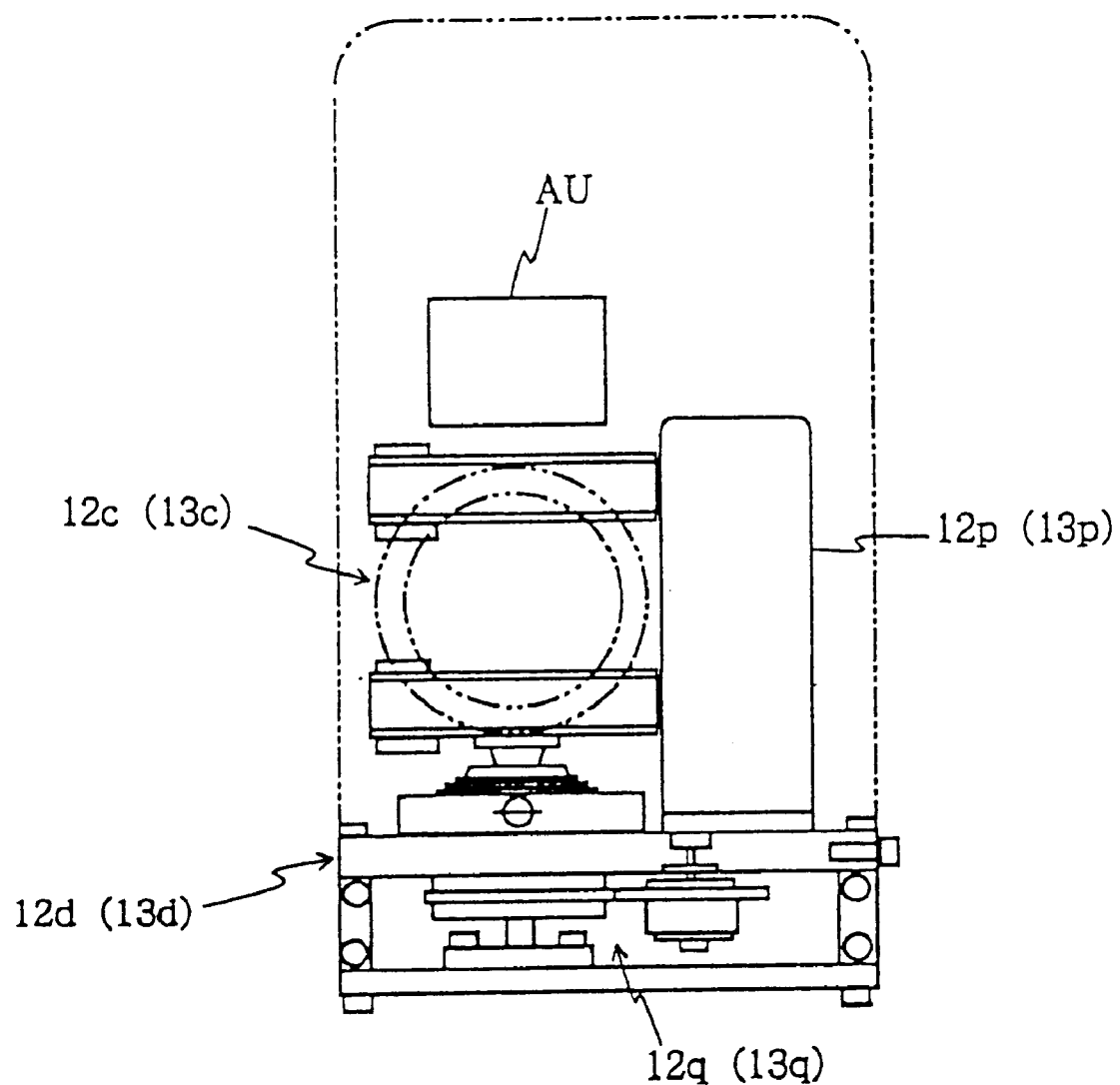
FIG. 7 is a partially enlarged side view showing a schematic structure of the picking arms of the arranging device.

FIG. 3 shows a detailed structure of the robot controller 40.

Referring to FIG. 3, the robot controller 40 comprises a board storage rack 41. The board storage rack 41 has a CPU board 42 and an image processing unit 43 for processing a signal from the camera 30 to generate image data. The CPU board 42 and the image processing unit 43 are connected via VMEbus.

The CPU board 42 comprises a peripheral device control unit 44 for controlling peripheral devices such as the conveying mechanism 20 and the camera 30, a conveyor position detecting unit 45 for detecting a position of the conveying belt based on the conveyor encoder value supplied by the encoder 24, a work position detecting unit 46 for detecting the position, posture and/or shape of the works W based on the image data generated by the image processing unit 43, a picking position computing unit 47 for computing a position at which each of the works W is to be picked on the carry-in conveyor 21 for each of the picking arms 12, 13, based on the information detected by the conveyor position detecting unit 45 and the information detected by the work position detecting unit 46, an allocation operation unit 48 for specifying the arm 12(13) to pick a specific work W based on the information computed by the picking position computing unit 47 and according to a given allocation algorism, and an arm control unit 49 for controlling each of the arms 12, 13 to arrange the works W on the carry-in conveyor 21 according to an operation result by the allocation operation unit 48 and the information computed by the picking position computing unit 47.

The allocation algorithm to be used by the allocation operation unit 48 when specifying the arm 12 (13) to pick the work W will now be explained.

(1) For instance, when uniformly allocating picking of the works W to the arms 12, 13, the works W coming into view of the camera 30 are sequentially numbered, and are in turn allocated to the arms 12, 13. When the operation result by the picking position computing unit 47 shows that some of the works W cannot be picked by the arm 12(13), the allocation operation unit 48 decides that these works W cannot be picked and sequentially allocates works W of the following numbers other than these works W to the arms 12, 13. Thereby, each of the arms 12, 13 can perform the arranging operation without being placed in an unnecessary wait state.

(2) When a particular arm, for example, the arm 12 is operated as a main arm and the arm 13 is operated as an auxiliary arm, the works W coming into view of the camera 30 are sequentially numbered and the main arm 12 is adapted to sequentially pick them. When the operation result by the picking position computing unit 47 shows that some of the works W cannot be picked by the main arm 12, the allocation operation unit 48 allocates these works W to the auxiliary arm 13.

When some of these works W cannot be still picked by the auxiliary arm 13, the allocation operation unit 48 decides that these works W cannot not be picked, and the auxiliary arm 13 is adapted to pick works W of lower numbers that are situated upstream from these works W and cannot be picked by the main arm 12.

(3) When plural types of works W are simultaneously conveyed on one conveying belt, the arm can be specified according to the type of the works W for improvement of the processing ability. In this case, the work position detecting unit 46 decides the type of each of the works W and the allocation operation unit 48 allocates the works W to the arms 12, 13 according to the type of each of the works W. Processing for the works W that cannot be picked by the arm 12 or 13 is similar to the case described above.

(4) When handling works W each having front and rear faces, the arm can be specified according to whether the face of each of the works W is a front face or a rear face for improvement of the processing ability. In this case, the work position detecting unit 46 decides whether the face of each of the works W is the front face or the rear face and the allocation operation unit 48 allocates the works W to the arms 12,13 according to decision results. Processing for the works W that cannot be picked by the arm 12 or 13 is similar to the case described above.

The works W which have not been picked in the above-described examples are returned to the upstream from the carry-in conveyor 21 by the reverse conveying mechanism 23.

Subsequently, the structure of the picking arms 12, 13 will be explained. For simplification and easy understanding of drawings, the picking arm 12 is illustrated as the main arm and the picking arm 13 is illustrated as "arm (13)" in description below.

FIGS. 4 through 7 show the structure of the picking arm 12(13). The picking arm 12(13) is provided with a hand 12a(13a) for picking the work W and is constructed by three axes having three degrees of freedom consisting of a first linear movement mechanism 12b(13b) (first axis) as a horizontal axis for moving the hand 12a(13a) in a horizontal direction of FIG. 4, a second linear movement mechanism 12c(13c) (second axis) as a vertical axis for moving the hand 12a(13a) in a vertical direction of FIG. 4, and a rotating mechanism 12d (13d) (third axis) as a rotation axis for rotating the hand 12a(13a) about its own axis. The first linear movement mechanism 12b(13b) and the rotating mechanism 12d(13d) are respectively controlled as axes of the robot by the robot controller 40 and the second linear movement mechanism 12c(13c) is controlled as a peripheral device by the robot controller 40.

Specifically, the carry-in conveyor 21 and the carry-out conveyor 22 have portions parallel with each other. A beam 12e(13e) having a U-shaped cross section opened upward for supporting the arm 12(13) is provided such that the beam 12e(13e) spans the parallel portions.

The beam 12e(13e) is provided with a rail 12g (13g) on a side wall 12f(13f) thereof such that it covers a range L required for moving the hand 12a(13a) in a space above the carry-in conveyor 21 and the carry-out conveyor 22 and protrudes toward an inner space of the beam 12e(13e).

The beam 12e(13e) is provided with a first driving motor 12i(13i) at a terminal point in the range L of the carry-in conveyor 21 on a bottom plate 12h(13h) of the beam 12e(13e) as a driving source of the first linear movement mechanism 12b(13b) and a transfer belt 12j(13j) extended over the range L by means of a pair of pulleys 12k(13k) to transmit torque of the first driving motor 12i(13i).

A support member 12m(13m) for supporting the second linear movement mechanism 12c(13c) and the rotating mechanism 12d(13d) is drivably fixed to the transfer belt 12j(13j) and slidably supported on the rail 12g(13g) to thereby constitute the first linear movement mechanism 12b(13b).

The second linear movement mechanism 12c(13c) comprises a second driving motor 12t(13t) as a driving source. The second driving motor 12t(13t) is supported by the support member 12m(13m) with its rotation axis being horizontally directed. The second linear movement mechanism 12c(13c) further comprises a movement direction conversion mechanism 12n(13n) for converting rotation of the rotation axis of the second driving motor 12t(13t) into a vertical movement. More specifically, the second driving motor 12t(13t) is constituted by a pulse motor and adapted to rotate at a predetermined angle during a predetermined period in accordance with a command from the arm control unit 20 to move a pipe-shaped hand support member 12o (13o) for supporting the hand 12a(13a) up and down by a predetermined distance to thereby move the hand 12a(13a) up and down.

The rotating mechanism 12d(13d) comprises a third driving motor 12p(13p) as a driving source. The third driving motor 12p(13p) is supported by the support member 12m (13m) with its rotation axis being directed downward in the vertical direction. The rotation of the rotation axis is transmitted to the hand support member 12o (13o) through a gear mechanism 12r(13r) to thereby rotate the hand 12a(13a) around its own axis.

The hand 12a(13a) has a suction pad P for suctioning the work W. A vacuum unit AU comprising a known suction detector, a known vacuum pump, a known vacuum filter, and the like is connected to the suction pad P via a piping PV and the pipe-shaped hand support member 12o(13o).

Subsequently, how so structured arranging device A arranges the work W will be explained.

(1) When each of the works W conveyed by the carry-in conveyor 21 comes into view of the camera 30, the work position detecting unit 17 detects the position, posture and/or shape of the work W based on the image data processed by the image processing unit 43.

(2) The conveyor position detecting unit 45 detects the position of the conveying belt based on the conveyor encoder value supplied by the conveyor encoder 24. The picking position computing unit 47 computes the position at which each of the arms 12, 13 is to pick the work W from the information pertaining to the position, posture, and/or shape of each of the works W which has been detected by the work position detecting unit 46 and the information pertaining to the position of the conveying belt which has been detected by the conveyor position detecting unit 45.

(3) The allocation operation unit 48 specifies the arm which is used to pick each of the works W, that is, the arm 12 and/or the arm 13 according to this computed position information and following the allocation algorism mentioned previously.

(4) The arm control unit 20 rotates the first driving motor 12i(13i) of the first linear movement mechanism 12b(13b) according to the position information computed by the picking position computing unit 47 to move the hand 12a(13a) to a point indicated by the computed position information.

(5) When the hand 12a(13a) is moved to the point of (4) described above, the arm control unit 49 outputs a command in accordance with which the second driving motor 12t(13t) constituted by the pulse motor rotates.

(6) In accordance with this command, the second driving motor 12t(13t) rotates at a predetermined angle and then the hand 12a(13a) moves downward from a wait position A (see FIG. 6) to a hold position B.

(7) When the hand 12a(13a) moves downward to the holding position B and the suction pad P of the hand 12a(13a)abuts with the work W, the vacuum pump of the vacuum unit AU is activated and the work W is thereby suctioned to the suction pad P.

(8) When it is detected by the suction detector that the work W has been suctioned by the suction pad P, the arm control unit 49 outputs the command in accordance with which the second driving motor 12t(13t) rotates at a predetermined angle to thereby move the hand 12a(13a) upward to the holding position (9) At the holding position C, the arm control unit 49 rotates the third driving motor 12p(13p) of the rotating mechanism 12d(13d) so that the work W held by the hand 12a(13a) has a proper posture according to the information pertaining to the posture of the work W detected by the work position detecting unit 46.

(10) Concurrently with the control for rotating the third driving motor 12p(13p) as described in (9), the arm control unit 49 controls the first linear movement mechanism 12b (13b) to move the hand 12a(13a) holding the work W to a predetermined position above the carry-out conveyor 22.

(11) When the hand 12a(13a) holding the work W is moved to the predetermined point above the carry-out conveyor 22 by the first linear movement mechanism 12b (13b), the arm control unit 20 controls the second linear movement mechanism 12c(13c) to move the hand 12a(13a) to a releasing position D at which the held work W is released.

(12) When the hand 12a(13a) is moved to the releasing position D, the held work W is released, and the respective works W are arranged to have a proper posture on the carry-out conveyor 22.

(13) In this embodiment, the wait position A can be level with the holding position C and the holding position B can be level with the releasing position D.

As should be appreciated from the forgoing description, in accordance with the first embodiment, the number of axes to be controlled for each of the arms 12, 13 is reduced so that a plurality of picking arms 12, 13 can be controlled by one robot controller 40. Specifically, only the first linear movement mechanisms 12b, 13b and the rotating mechanisms 12d, 13d are controlled to be moved according to the positions and postures of the works W being randomly supplied, while the second linear movement mechanisms 12c, 13c are moved by a predetermined distance during a given period. Thereby, the system can be simplified and cost can be reduced while carrying out a comparatively simple operation such as arrangement of the works W.

Since the number of the image processing unit 43 and the number of the vision sensor 30 used for capturing the information pertaining to the position, posture and/or shape of the work W are respectively equal to the number of the robot controller 30, i.e., one, irrespective of the number of the arms, the system can be further simplified. In addition, because the number of the image processing unit 43 is one, it is easy to build this in the robot controller 40.

Further, since each of the arms has a structure according to difficulty of the operation, high operating speed of the arm can be achieved, which results in a greatly improved processing ability.

For instance, the conventional general-purpose six axes robot has an ability to handle about 30 works per minute, while one arm of the arranging device of this embodiment has an ability to handle about 60 works per minute because of high-speed operation of the arm. Therefore, if the number of arms of a robot is two, then the robot is capable of handling 120 works per minute, which results in a four-times higher processing ability.

In this example, since the number of the arms can be easily set to three, a six-times higher processing ability can be achieved by using the robot controller of specification identical to the conventional robot controller.

Furthermore, for works W whose postures need not be corrected, for example, circular works W, the robot controller 40 may be adapted to control only the operation of the horizontal axis. In this case, since the robot controller 40 controls an axis per arm as the axis of the robot, the number of the arms can be set to six or more, for example, eight. In this case, since the operating speed of the arm can be further increased, a sixteen-times higher processing ability can be achieved as compared with the case where the conventional general-purpose robot is used.

Moreover, since the reverse conveying mechanism 23 is provided in this embodiment, it is not necessary to adjust the number of works W supplied to the arranging device A, which makes the operation easier.

While the second linear movement mechanisms 12b, 13b are not controlled by the robot controller 40 as the axes of the robot in the arranging device A of this embodiment, this is illustrative. For instance, when the robot controller 40 has an extra capacity, the second linear movement mechanisms 12b, 13b can be controlled by the robot controller 40 as the axes of the robot. Also in this configuration, since the number of arms can be set to two per robot, the processing ability can be greatly improved. In case of handling the circular works W, the number of arms can be set to four per robot, and therefore the processing ability can be greatly improved.

Embodiment 2

An arranging device of a second embodiment is a modification of the carry-in conveyor 21 of the arranging device A of the first embodiment, and the other structure is identical to that of the arranging device A of the first embodiment.

Figure 8:
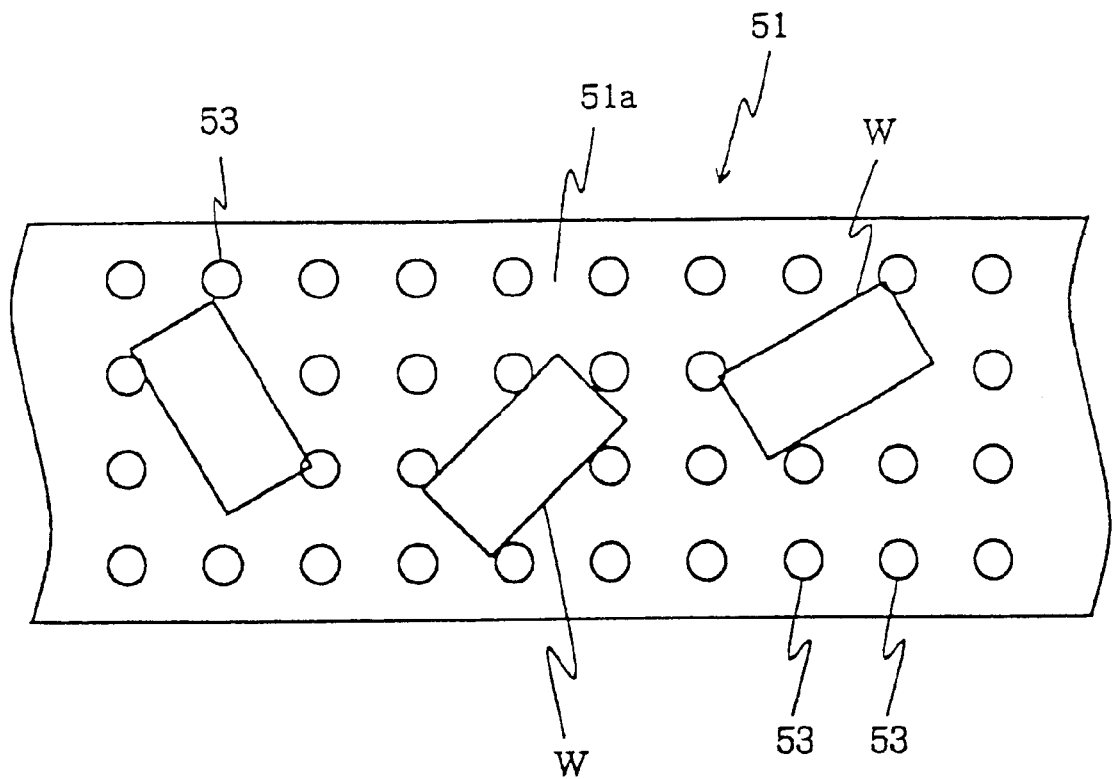
FIG. 8 is a partially enlarged plan view showing a shape of a conveying belt of an arranging device according to a second embodiment of the present invention.

FIG. 8 shows a schematic structure of a carry-in conveyor for use by the arranging device according to the second embodiment of the present invention. Referring to FIG. 8, there is shown a carry-in conveyor 51 which is provided with many protrusions 53 on a surface of a conveying belt 51a for preventing the rolling of works. These protrusions make it easy to handle spherical or cylindrical works W which are liable to roll.

When the picking arms 12, 13 pick the works W according to the positions and postures of the works W detected by the work position detecting unit 17, there should be a match between the detected positions and postures of respective works W and the picking positions of the picking arms 12, 13 on the carry-in conveyor 51.

However, in case of the spherical or cylindrical works W which are liable to roll, the works W roll while they are conveyed and are not picked by the picking arms 12, 13. Accordingly, in the arranging device of the second embodiment, many protrusions 53 are provided on the surface of the conveying belt 53a to prevent the change of the positions and postures of the works W being conveyed on the conveying belt 51a.

Figure 9:
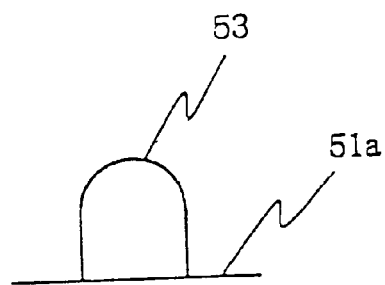
FIG. 9 is a partially enlarged side view showing a shape of a protrusion of the conveying belt of the arranging device.

FIG. 9 shows the shape of each of the protrusions 53 provided on the surface of the conveying belt 51a. The protrusion 53 are made of a transparent material such as transparent chloroethene so that the protrusions 53 will not prevent the work position detecting unit 17 from detecting the position, posture, and/or shape of each work W by using a light transmitted from the lighting device 25, and have a hemispherical tip portions to prevent damage to the works W. The protrusions 53 are arranged on the surface of the conveying belt 51a, for example, in lattice, at small intervals to prevent the works from getting therein.

Thus, in accordance with the second embodiment, since many protrusions 53 are provided on the surface of the conveying belt 51a of the carry-in conveyor 51, it is possible to handle the spherical or cylindrical works W which are liable to roll. Since the protrusions 53 are transparent, it is possible to arrange the works by using the arranging device of common specification regardless of whether or not the works W are liable to roll. Therefore, it is not necessary to install a plurality of arranging devices according to the shape of the works W. Cost and space can be thereby saved. In addition, it is not necessary to prepare a plurality of arranging devices according to the shape of the works W. Thereby, space can be saved. Further, it is possible to save time required for set up such as change of the belt.

Figure 10:
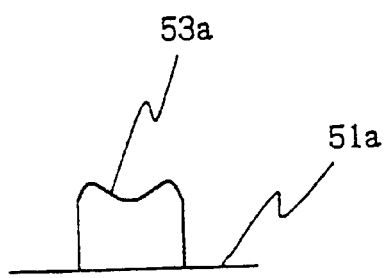
FIG. 10 is a partially enlarged side view showing an alternation of the shape of the protrusion of the conveying belt of the arranging device.

While the protrusions 53 have hemispherical tip portions in the second embodiment, the shape is not limited to this, and it is preferable that they are round for prevention of damage to the works W. For example, as shown in FIG. 10, a concave portion 53a may be provided at the center of the tip portion.

Instead of providing the protrusions 53 only on the carry-in conveyor, they can be provided on the carry-out conveyor as well. This prevents the arranged works W from rolling and changing their positions and postures.

Embodiment 3

Figure 11:
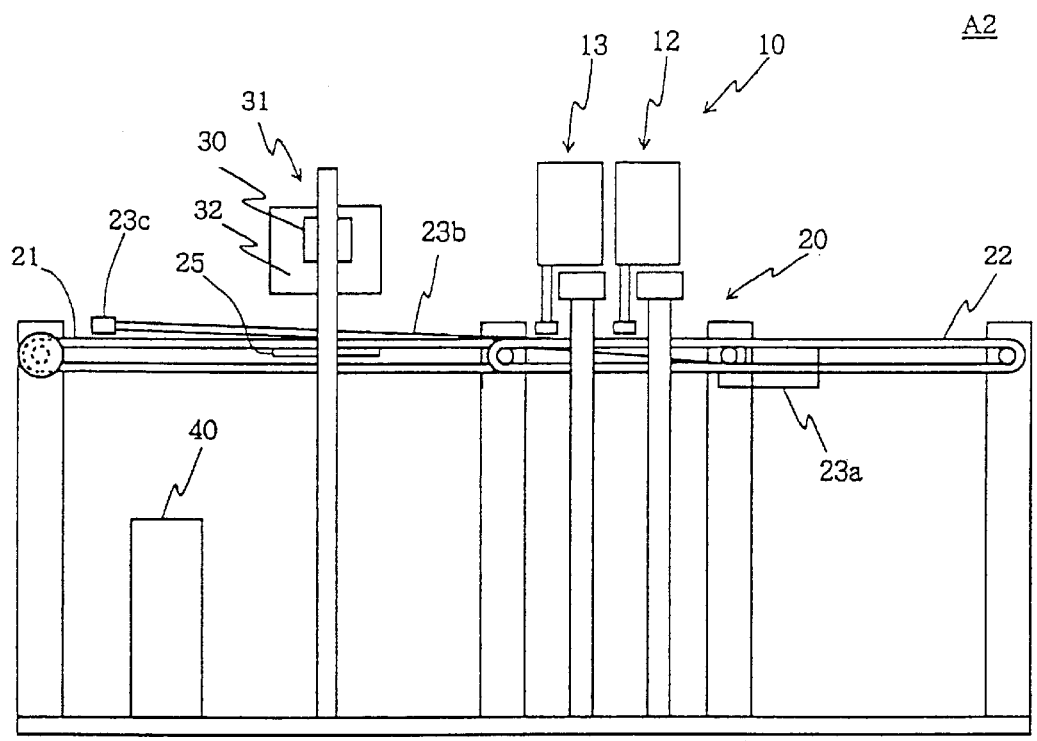
FIG. 11 is a front view showing a schematic structure of an arranging device according to a third embodiment of the present invention.
Figure 12:
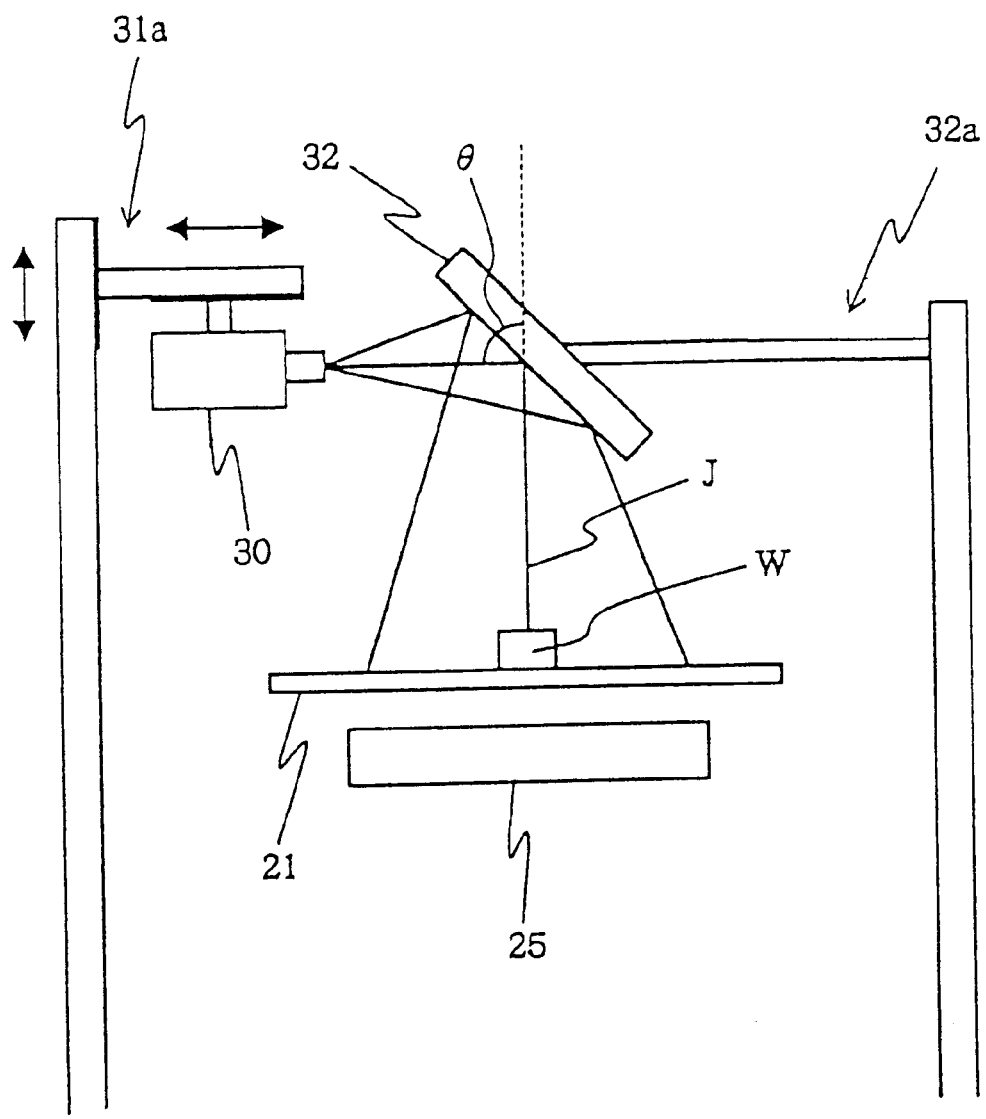
FIG. 12 is a partially enlarged side view showing an example of how a camera and a mirror of the arranging device are placed.

FIGS. 11 and 12 show a front view and a structure of a main part of an arranging device according to a third embodiment of the invention. An arranging device A2 is a modification of an imaging system of the arranging device A of the first embodiment so that the camera 30 can be placed at a lower position. In brief, the arranging device A2 comprises a light path changing means. The other structure is identical to that of the first embodiment.

In a case where an image of the work W is taken by a camera from above, if the installed position of the arranging device is restricted in a vertical direction, it is sometimes impossible to install the arranging device because the camera is an obstacle. Accordingly, in the third embodiment, the imaging system is provided with a mirror 32 to give degrees of freedom to placement of the camera 30.

Specifically, in the arranging device A2, a mirror 32 is provided at a predetermined position above the carry-in conveyor 21 to bend an imaging light path J of the camera 30 through a predetermined angle θ. The mirror 32 has an area large sufficient to reflect the entire image to be taken by the camera 30 and is supported by a support mechanism 32a so that its inclination can be adjusted according to the position of the camera 30.

The camera 30 is supported by a camera support mechanism 31 provided on a side of the carry-in conveyor 21. The camera support mechanism 31 includes a support position adjustment mechanism 31a for adjusting a support position of the camera 30 in vertical and horizontal directions and a posture of the camera 30 within a predetermined range. This makes it possible to support the camera 30 at the position and posture in which the image of the work W reflected by the mirror 32 can be taken by the camera 30.

Thus, in the arranging device A2 of the third embodiment, since the imaging system is provided with the mirror 32 to bend the imaging light path J of the camera 30, it is possible to place the camera 30 at a lower position. Consequently, it is possible to install the arranging device A2 when the installed position of the arranging device A2 is restricted in the vertical direction.

Embodiment 4

An image processing method of a fourth embodiment is a modification of the image processing method by the image processing unit 43 of the first embodiment, which enables an arranging device to handle both transparent works w and non-transparent works W. The other structure is identical to that of the first embodiment.

In case of the transparent work W, its mage taken by the camera 30 has a small difference of lighting (light and shade) between the work W and its background. Depending on the placement of the lighting device 25, the difference of lighting, for example, the difference in which a peripheral area of view is dark and a central area of view is bright, is sometimes generated. The influence of this difference makes it difficult for the work position detecting unit 17 to detect the position and posture of each work W. Therefore, when the transparent works W are to be handled by the arranging device, it is necessary to change specification, for example, by placing the lighting device 25 with great care and adopting the conveying belt with the highest transparency as the conveying belt of the carry-in conveyor 21.

Accordingly, in the fourth embodiment, the image processing method by the image processing unit 43 is modified to thereby allow the same arranging device to handle the transparent works W and the non-transparent works W without special specification.

Hereinbelow, the image processing performed by the image processing unit 43 of the arranging device according to the fourth embodiment, i.e., processing for transparent works will be specifically described.

(1) An image (hereinafter referred to as a "background image") in which the works W are not conveyed is taken by the camera 30, and the resulting image data is stored in an image data memory (not shown) in the image processing unit 43.

(2) An image (hereinafter referred to as a "work captured image") in which the works W are conveyed is taken by the camera 30.

(3) The background image is subtracted from the work captured image. Thereby, the influence of the difference of lighting is reduced.

(4) The image data is processed in such a manner that image highlighting and noise removal are conducted and then is output to the work position detecting unit 46.

Thus, in the fourth embodiment, since the image processing unit 43 is adapted to perform the image processing so as to reduce the influence of the difference of lighting within the field of view of the camera 30 by using the background image, both the transparent works and the non-transparent works can be arranged by the same arranging device. Thereby, it is not necessary to change the specification of the lighting device and the conveying belt between the transparent works and the non-transparent works. Consequently, the cost can be reduced and the time required for set up can be saved. It should be noted that the transparent works W and the non-transparent works W may coexist when conveyed.

Embodiment 5

Figure 13:
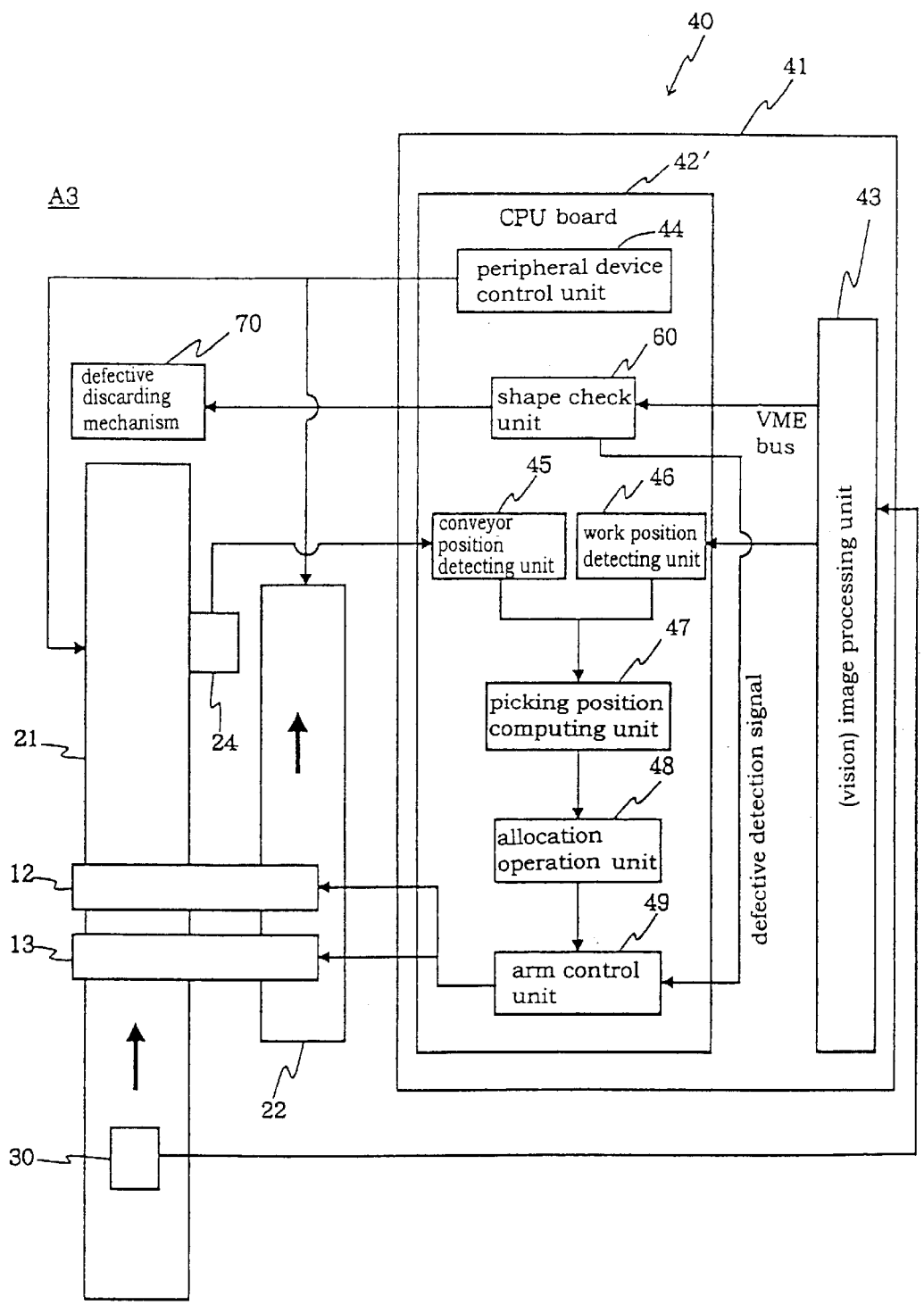
FIG. 13 is a schematic structure of a control system of an arranging device according to a fifth embodiment of the present invention.
Figure 14:
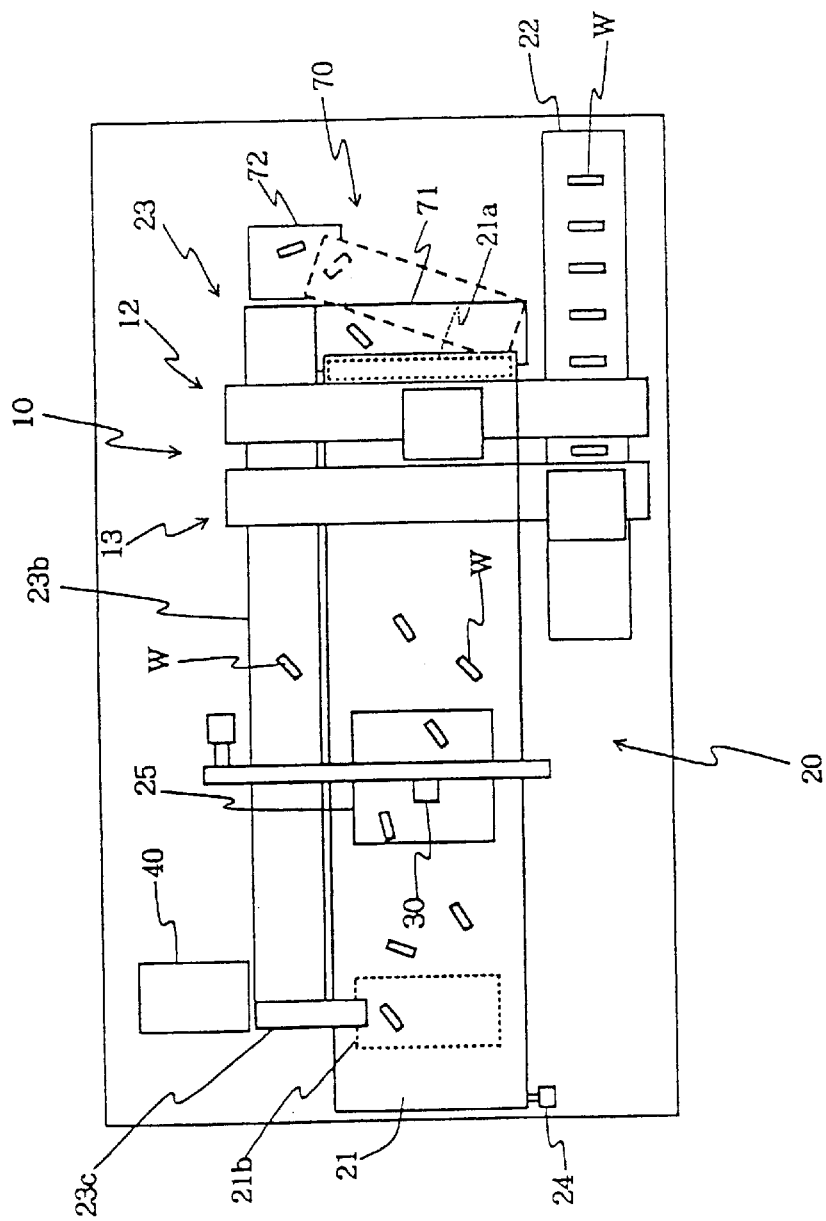
FIG. 14 is a top plan view showing a schematic structure of the arranging device.

FIGS. 13 and 14 show a schematic structure of an arranging device according to a fifth embodiment of the present invention. An arranging device A3 is configured such that the CPU board 42 of the arranging device A of the first embodiment is provided with a shape check unit 60 to check the shape of the work W when arranged and a defective discarding mechanism 70 for discarding a work W that has been judged defective through shape check is added to the arranging device A. The other structure is identical to that of the first embodiment.

FIG. 13 shows an outline of a control system of the arranging device A3 and FIG. 14 shows the arranging device A3 seen in a plan view.

Specifically, a CPU board 42' of the arranging device A3 of the fifth embodiment is provided with a shape check unit 60 for conducting shape check of the work W.

The shape check unit 60 conducts various types of shape checks based on image data from the image processing unit 43 as mentioned later. According to the check result, the shape check unit 60 controls operation of the defective discarding mechanism 70 for discarding the work W that has been, judged defective and outputs a defective detection signal used for instructing the arm control unit 49 to handle the defective work differently from handling of good works, for example to prohibit the arm control unit 49 from picking the work W that has been judged defective.

Specifically, the defective discarding mechanism 70 comprises an overflow shooter 71 for switching destination of the work W to be conveyed according to the check result by the shape checking unit 60 and a defective discarding unit 72 for gathering the defective works W conveyed by the overflow shooter 71.

Hereinbelow, the shape check process conducted by the shape check unit 60 will be explained.

(1) Outer Shape Check

Comparison is made between a taught outer shape of a good work and an outer shape of a work W to be checked to compute an index indicating degrees of matching of the outer shapes of these works. When the index is higher than a threshold, it is judged that the work W is a good work, whereas when it is lower, it is judged that the work W is a defective work. In this case, considering the degrees of matching of outer shapes of specific portions of the works as important, the matching may be computed by a method using weighting. For instance, the degrees of matching of portions tending to be influenced by defect, such as protrusions at the tip of containers may be considered as important.

(2) Check Based on Amounts of Outer Characteristics

Comparison is made between amounts of outer characteristics such as an area, a peripheral length, the number of holes, a maximum radius, a minimum radius, a radius ratio, a major axis length, a minor axis length, the ratio of the major axis length to the minor axis length, and circularity of a good work, which characteristics are taught in advance, and amounts of outer characteristics of a work W to be checked, to compute an index indicating the degrees of matching of these compared amounts of outer characteristics. When the index is within a predetermined range, it is judged that the corresponding work is a good work, while it is outside the range, it is judged that the corresponding work is a defective work. In this check, necessary items of the amounts of outer characteristics are selected according to the type of works or need of the user, or some of the amounts of outer characteristics are combined to be used for check.

(3) Check Based on Specific Information of Specific Portions

Shape check is conducted based on specific information only for a specific portion of a work W. For instance, only for a protrusion at the tip of a container, the specific information such as the shape of the protrusion, the existence/non-existence of the protrusion, and the dimension of the protrusion are checked. Or, when a mark is attached to a container, it is checked whether or not the container has the mark.

In this case, the specific information of the good work for the specific portion of the work W is taught in advance, and this specific information is compared to specific information of the specific portion of each work W to be checked to thereby judge whether or not there is a match between them. When there is a match between them, it is judged that the work W is a good work, whereas when there is no match between them, it is judged that the work W is a defective work.

It should be noted that the necessary check items can be conducted in view of the shape of the work W or the need of the user.

Subsequently, the operation of the arranging device A3 based on the check result of the shape check unit 60 will be explained.

(a) The necessary check items are selected according to the works W to be arranged, and information pertaining to the good work used as a reference in this check is stored in the shape check unit 60.

(b) The shape check unit 60 conducts the shape check based on the image data of each work W whose image is taken by the camera 30 as described above. When there is no work that has been judged defective, processing is performed following the same procedure as described in the first embodiment.

(c) When there is a work that has been judged defective by the shape check unit 60, the unit 60 outputs a defective detection signal to the arm control unit 49 to prohibit the picking arms 12, 13 from picking the defective work.

(d) Simultaneously, the shape check unit 60 outputs a switching signal to the defective discarding mechanism 70, in accordance with which destination of the work being conveyed on the overflow shooter 71 is switched to the defective discarding unit 72, when the defective work W is dropped to the overflow shooter 71 from the carry-in conveyor 21.

Thus, in the arranging device A3 of the fifth embodiment, since the shape check of the work W is conducted by the shape check unit 60 in parallel with processing for arrangement of the works W, the conventional check step performed by a special check device in a previous or subsequent step can be dispensed with and productivity can be improved. Besides, since the system can be simplified, cost can be reduced.

The configuration of the defective discarding mechanism 70 is not limited to that of the fifth embodiment. For instance, the defective works may be directly dropped into the defective discarding unit 72 instead of being received by the overflow shooter 71. Moreover, the defective works W may be picked by the picking arms 12, 13 and directly conveyed to the defective discarding unit 72.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A random work arranging device that arranges randomly conveyed works by using a robot and carries out the arranged works, wherein the robot comprises:
   a plurality of arms; and
   a single robot controller for controlling respective arms independently one another to arrange and transfer the works from a conveying position to a carry-out position.

2. The random work arranging device of claim 1, wherein the robot arranges and transfers the work from the conveying position to the carry-out position according to a signal from a position sensor for detecting a conveying position of a conveying belt for conveying the work and a signal from a vision sensor for detecting a position, posture, and/or shape of the work conveyed by the conveying mechanism.

3. The random work arranging device of claim 1, wherein the work which has not been carried out is returned to a conveying starting point.

4. The random work arranging device of claim 1, wherein the work is made to have a desired posture while being transferred by each of the arms.

5. The random work arranging device of claim 1, wherein each of the arms is specified to transfer a specific work.

6. The random work arranging device of claim 1, wherein when deciding that there is a work that cannot be transferred by arms, an arm is specified to transfer a work situated upstream from the work that cannot be transferred.

7. The random work arranging device of claim 1, wherein the work is prevented from rolling while being conveyed.

8. The random work arranging device of claim 7, wherein protrusions are provided on a surface of a conveying belt of the conveying mechanism such that they are arranged in a predetermined configuration.

9. The random work arranging device of claim 8, wherein the conveying belt including protrusions is transparent.

10. The random work arranging device of claim 9, comprising a light path changing means for changing a light path of light transmitted through the conveying belt.

11. The random work arranging device Of claim 10, wherein the light path changing means is a mirror provided at a predetermined angle at a predetermined position above the conveying belt.

12. The random work arranging device of claim 11, wherein an angle of the mirror is adjustable.

13. The random work arranging device of claim 1, comprising an image processing means for recognizing a transparent work in a transparent work recognition process.

14. The random work arranging device of claim 13, comprising a shape check unit for checking a shape of a work based on image data from the image processing means.

15. The random work arranging device of claim 14, wherein an outer shape of the work is checked.

16. The random work arranging device of claim 14, wherein the outer shape is checked based on various amounts of outer characteristics of the work.

17. The random work arranging device of claim 14, wherein the shape is checked based on specific information of a specific portion of the work.

18. The random work arranging device of claim 14, comprising a defective discarding mechanism for discarding a work that has been judged defective in a check process performed by the shape check unit.

19. The random work arranging device of claim 14, wherein each arm is constituted by three axes, two of which are controlled by the robot controller as axes of the robot.

20. The random work arranging device of claim 19, wherein an axis other than the two axes controlled by the robot controller is controlled by the robot controller as a peripheral device.

21. The random work arranging device of claim 1, wherein each arm is constituted by three axes which are controlled by the robot controller as axes of the robot.

22. The random work arranging device of claim 1, wherein each arm is constituted by two axes, one of which is controlled by the robot controller as an axis of the robot.

23. The random work arranging device of claim 21, wherein an axis other than the axis controlled by the robot controller is controlled by the robot controller as a peripheral device.

24. The random work arranging device of claim 1, wherein each arm is constituted by two axes which are controlled by the robot controller as axes of the robot.

25. The random work arranging device of claim 1, wherein the robot controller comprises a peripheral device control unit for controlling a peripheral device conveying mechanism including a conveying belt and a camera, a conveyor position detecting unit for detecting a position of the conveying belt; a work position detecting unit for detecting a position, posture and/or shape of each work based on image data generated by the image processing unit; a picking position computing unit for computing a position at which each work is to be picked on the carry-in conveyor for each of the arms based on information detected by the conveyor position detecting unit and the work position detecting unit; an allocation operation unit for specifying an arm among the arms to pick a specific work based on the information computed by the picking position computing unit and according to a predetermined allocation algorithm; and an arm control unit for controlling each arm to arrange the work on the carry-in conveyor according to an operation result by the allocation operation unit and the information computed by the picking position computing unit.

* * * * *